Dec. 21, 1926.　　　　　　　　　　　　　　　　　1,611,593
P. KAPITZA
ELECTRICAL IMPULSE GENERATING APPARATUS
Filed April 12, 1926　　　2 Sheets-Sheet 1
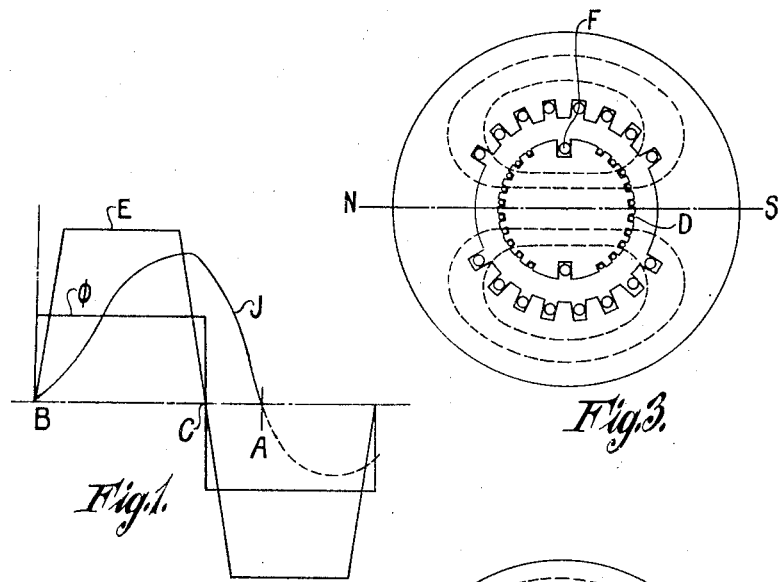
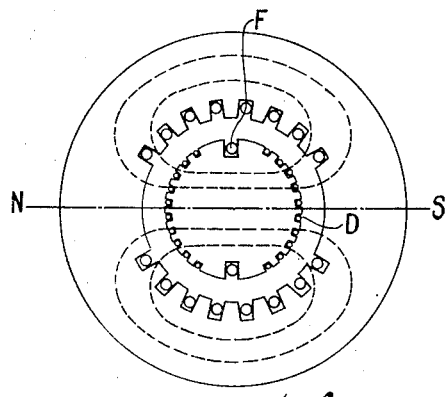
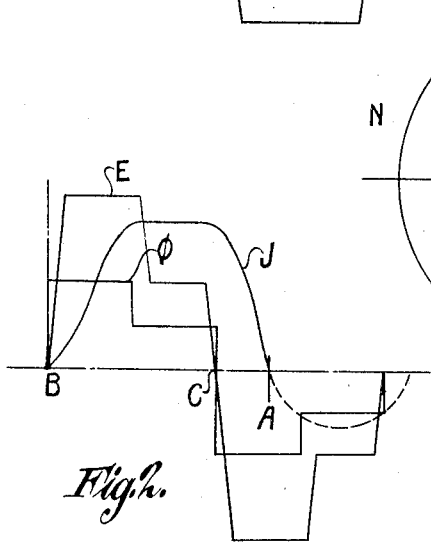
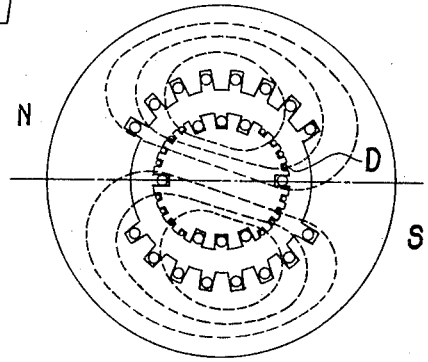
Witnesses:-
Inventor
Peter Kapitza
By Wesley L. Carr
Attorney.

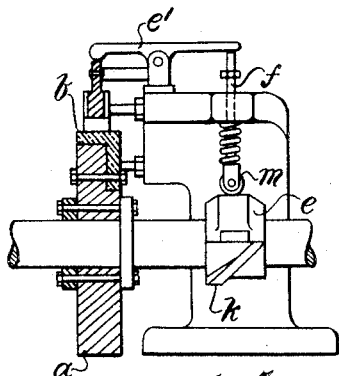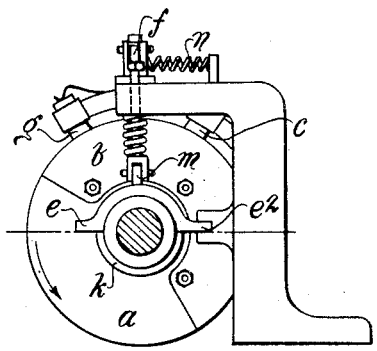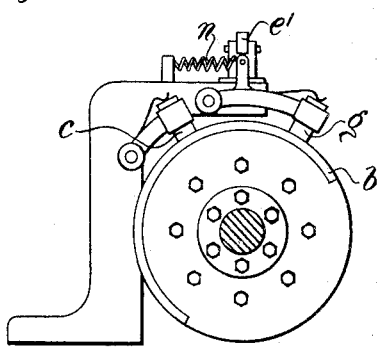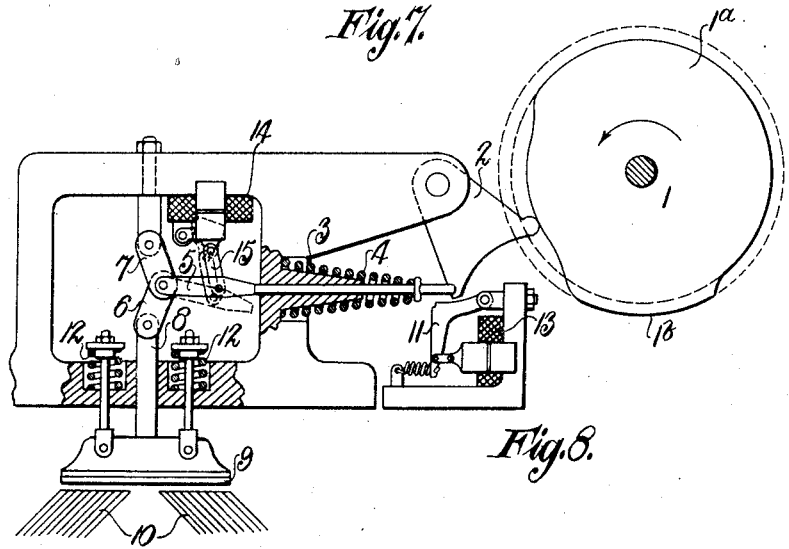

Patented Dec. 21, 1926.

1,611,593

UNITED STATES PATENT OFFICE.

PETER KAPITZA, OF CHESTERTON, ENGLAND.

ELECTRICAL IMPULSE-GENERATING APPARATUS.

Application filed April 12, 1926, Serial No. 101,586, and in Great Britain December 30, 1924.

This invention relates to apparatus for generating impulses of very large electric power for very short intervals of time such as may be required for signalling purposes or for the creation of intense magnetic fields.

The invention comprises the combination of an alternating-current generator and a switch in a manner hereinafter described.

If an alternating current generator is short-circuited on a small impedance of the order of the generator itself, it is known that for the first few waves before the excitation field is neutralized a very strong current passes through the circuit.

Broadly considered, the increase in current which may be obtained immediately after a short circuit may be expressed as follows:—

$$\frac{\text{Momentary short-circuited current}}{\text{Permanent short-circuited current}} = \text{armature self-induction} + \frac{\text{armature reaction}}{\text{armature self-induction}}$$

The short-circuit current diminishes throughout the period of time required for the neutralization of the field-coil flux, the diminution of which is opposed by the reactance of the field-coil circuit and the eddy currents in the iron core.

Thus if the armature reaction is large relatively to the armature self-inductance the power yielded in the external circuit on momentary short-circuit may be very large and exceed the power at which the generator is usually rated by 50 or 100 times.

This invention consists primarily in using the power yielded by the generator in the first half current wave by means of an automatic synchronously-operating switch which is operable at will and which makes the circuit only for the time of the first half-current wave. The high power obtained in such a way is not directly contributed by the machine which drives the generator but is supplied from the kinetic energy stored in the rotating parts of the generator or from a fly wheel coupled with the generator.

The invention is illustrated in the accompanying drawings in which:

Figs. 1 and 2 show curves of current, flux and electromotive force;

Figs. 3 and 4 sections of a generator;

Figs. 5 to 7 views of a switch gear and Fig. 8 a second form of switch gear.

Turning now to the drawings, in Fig. 1 the curve E shows the electromotive force induced in the armature winding of the generator. At the point of time B Fig. 1, when this electromotive force is zero, maximum flux $\varphi$ passes through the winding of the generator and according to the invention the machine is at this point short-circuited by the automatic switch and the current J is gradually built up. The switch maintains the circuit closed up to the point A Fig. 1, when the current has dropped to zero. This point owing to the fact that the machine as well as the external load have inductance is shifted by the distance C A, Fig. 1, from the point C at which the electromotive force curve E drops to zero. The breaking of the current at point A is easy as the current is practically zero at this point, which makes this method of obtaining electrical impulses superior to those in which a direct-current machine is used, where the problem of breaking a strong current is always difficult. From the general theory of the short-circuiting of alternating-current generators, it is known that the amplitude of the current is largest when the circuit is shorted at the moment when the electromotive force is zero. For this reason the current is started at the point B in Fig. 1. The shape of the electrical current curve obtained in these half waves will depend on the shape of the magnetic field wave shape produced by the excitation winding in the alternating-current generator. By special arrangement of the windings shown in Figs. 3 and 4 by letter F it is possible, for example, to obtain two different shapes of field as shown respectively by the curves $\varphi$ in Figs. 1 and 2. The armature shown in Fig. 4 will produce an electromotive force E which will give a current wave with a flat top as illustrated at J in Fig. 2. Thus, by altering the distribution of the field winding it is always possible to obtain the shape of the current wave which will satisfy the requirements of the purpose for which the generator is used. For this invention a generator either of the type of rotating fields or rotating armatures is used, preferably of a high speed and arranged in such a way that the impedance of the generator is made as small as possible. The maximum power yielded by the machine is approximately equal to:—

$$W_{max} = \frac{F^2 \omega^2}{X}$$

where X is the impedance, ω the angular velocity and F the total flux through the winding. It is also preferable for obtaining large power that the flux is as large as possible, and if no special form of the impulse is required the most efficient winding will be as shown in Fig. 3. To reduce the impedance and to increase the flux through the winding it is preferable to make the generator with a small air gap and to shield the excitation winding by copper connections such as damping bars D, Figs. 3 and 4, and to arrange the armature winding in such a way that it has as little as possible stray field. By such arrangements it is found possible to obtain from a generator of continuous rating at 1500 kilowatts, impulses corresponding to a power of 200,000 kilowatts. The design of the generator requires to be specially rigid as large physical forces occur during the short-circuiting.

The switch necessary for momentary short-circuiting can be made in several ways. Two preferred forms are illustrated both of which are operated directly from the shaft of the generator. The switch illustrated in Figs. 5 to 7 will now be described.

A disc $a$ made of insulating material such as fibre or ebonite has on its circumference a conducting segment $b$. This disc is driven direct from the generator by means of any mechanical means such as by gears, chains or direct coupling. A brush $c$ is placed in contact with the disc and is adjusted or timed in such a way that at the moment when the segment comes under the brush the electromotive force is zero so that the circuit is closed at the right moment. A second brush $g$ is arranged to make contact with the segment but is adjusted or timed in such a way that the segment leaves it at the moment when the current drops to zero. Thus the segment is in contact with both brushes only for the necessary interval of time corresponding to B to A in Figs. 1 and 2. The brush $g$ is caused to remain pressed to the disc and segment only for one full revolution of the shaft by an arrangement which comprises a helicoidal thread $h$ on the shaft and a split nut or half-nut $e$ which is movable along this thread. A rod $f$ carrying a roller $m$ is pressed downwardly by means of a spring, the rod engaging a rocker arm $e^1$ which is adapted to depress the brush $g$ on the disc against the action of a spring $n$. When it is desired to make the impulse the split nut is set up on the shaft at the left of the median position shown in Fig. 5. It is then urged by hand towards the right and is caught by the thread and passed through the median position during which time it lifts the roller $m$ and makes the necessary contact. The half nut $e$ illustrated has a lug $e^2$ which slides in a slot in the frame of the machine during this movement. To make a second contact the half nut is removed and again set up on the shaft at the left of the median position in Fig. 5.

Alternatively, the switch may operate a stationary contact by means of a cam shaft and a system of levers as shown in Fig. 8. The cam 1 is driven from the shaft of the main generator and may be either coupled directly or driven by means of a chain or by means of gear wheels. This cam is adapted by means of a lever 2 to push the rod 3 which is pressed back on the cam by means of a spring 4. The push-rod 3 through a link 5 presses on the joint of two hinged vertical links 6 and 7. The link 6 is connected to a vertical rod 8 carrying an insulated copper plate 9 at its lower end, and the copper plate is adapted to press on two brushes 10 which form the contacts which are to be closed and opened by the apparatus. The plate is urged upwardly by springs 12 and the link 5 is articulated to an arm 15 supported from the armature of coils 14. A trigger 11 for the lever 2 is controlled by coils 13. The operation of the switch is the following:—

The cam 1 freely rotates and the lever 2 is held up by the trigger 11 from the cam. The end of the push link 5 is below the end of the push rod as shown in dotted lines. The toggle links 6 and 7 are on the right hand side of the dead centre line and the copper plate 9 is well off the brushes 10 under the action of the springs 12. In order to make the switch operate at the right moment, a current is passed through the electro-magnet 13 which pulls down the trigger 11. The lever 2 falls down on to the cam and the push rod 3 begins to make a reciprocating motion as the lever follows the shape of the cam. A current is also sent through the electro-magnet 14 which by means of the link 15 pulls up the push link 5 at the moment when the lever is on the deepest part of the cam. Prior to this movement of the link 5, movement of the cam cannot reach the links 6, 7 and the parts are in the "safe" position, as indicated by the dotted-line position of the link 5; but the raising of the link 5 at the moment when the lever is on the deepest part of the cam, as indicated in the drawing, arms or sets the switch so that the push rods 3 and 5 engage together in direct alinement, as indicated in full lines, and in the further movement of the cam, when the lever engages the lower elevation $1a$ thereof, the push rods 3 and 5 are moved to the left until the links 6 and 7 are straightened and the copper plate 9 is pressed on to the brushes 10 so that the contact is established. Contact continues until the second elevation 1b of the cam reaches the lever and this further pushes the push rod to the left. The links 6 and 7 are thrown beyond their dead centre and the copper plate separates from the copper brush. Finally, the copper plate is fully raised from the copper brushes under the action of the springs 12, and the lever 2 is again caught by the trigger 11 so that it will not move back to the right into engagement with the cam. The general advantages of this link mechanism are as follows:—

The moment of the make and the break is controlled by the pressure from the cam and a uni-directional motion of the push rod operates both the make and the break. The lever is in contact with the cam during one revolution only. By using a double gap for the break the speed with which the air gap between the contacts increases is twice as much as in the case of a single contact. The elevation of the cam has to be carefully designed and the making elevation 1a is fixed and the breaking elevation 1b can be made adjustable as the moment of the make is fixed and the moment of the break depends upon the impedance of the load.

As the moment of the break cannot in practice be exactly predetermined and there is always a small current at the moment of breaking, in either system, it will be understood that the arcing may be reduced by any means (not shown), without departing from the spirit of my invention.

While I have illustrated my invention in two embodiments in both of which the switch when set or armed makes and breaks contact once only and then requires manual resetting, I desire such illustration to be taken as suggestive only, and I do not by any means wish to convey the impression that automatic resetting of the contact device is excluded. The essential feature of my invention is that the contact shall be made once only, as described, on the performance of a separate control operation such as the energizing of the coils 14. The description of the switch as operating "once only", therefore, does not mean that the device is incapable of repeated actuation if the control operation is repeated.

I claim as my invention:—

1. The method of obtaining a powerful impulse of electric current for a brief interval of time, which consists in connecting a low impedance external circuit across a rotating alternating-current generator for an interval of time which is of the order of that of between one half and one cycle only of the alternating voltage.

2. The method of obtaining a powerful impulse of electric current for a brief interval of time, which consists in connecting a low impedance external circuit across a rotating alternating-current generator approximately at a moment when the alternating voltage is zero and disconnecting said circuit at the moment when the current is next approximately zero after a single impulse.

3. The method of obtaining powerful impulses of electric current for brief intervals of time, which consists in connecting a low impedance external circuit across a rotating alternating-current generator for intervals of time which are of the order of that of one cycle only of the alternating current and precluding a subsequent similar operation until the flux-changing conditions consequent upon the preceding connection have passed.

4. The method of obtaining powerful impulses of electric current for brief intervals of time, which consists in connecting a low impedance external circuit across a rotating alternating-current generator approximately at a moment when the alternating voltage is zero, disconnecting said circuit at the moment when the current is next approximately zero after a single impulse, and precluding a subsequent similar operation until the flux-changing conditions consequent upon the preceding connection have passed.

5. Apparatus for producing a powerful impulse of electric current for a brief interval of time comprising in combination an alternating current generator, a low impedance external circuit, a switch for connecting said circuit across said generator, and means effective for closing said switch for an interval of time which is of the order of that of between one half and one cycle only of the alternating current.

6. Apparatus for producing a powerful impulse of electric current for a brief interval of time comprising in combination an alternating-current generator, a low impedance external circuit, a switch for connecting said circuit across said generator and means which effect the closure of said switch approximately at a moment when the alternating voltage is zero and which effect the opening of said switch when the current is next substantially zero after a single impulse.

7. Apparatus for producing powerful impulses of electric current for brief intervals of time comprising in combination an alternating-current generator, a low impedance external circuit, a switch for connecting said circuit across said generator, means which effect the closure of said switch at a predetermined instant in the alternating voltage cycle and which effect the opening thereof after an interval of time which is not more than one cycle of the alternating voltage, and means for precluding another similar operation of the switch for a greater interval of time.

8. Apparatus for producing powerful impulses of electric current for brief intervals of time comprising in combination an alternating-current generator, a low impedance external circuit, a switch for connecting said circuit across said generator, means which automatically effect the closure of said switch approximately at a moment when the alternating voltage is zero and open it again when the current is next again substantially zero after a single impulse.

9. Apparatus for producing powerful impulses of electric current for brief intervals of time comprising in combination an alternating-current generator, a low impedance external circuit, a switch for connecting said circuit across said generator, means which automatically effect the closure of said switch approximately at a moment when the alternating voltage is zero and open it again when the current is next again substantially zero after a single impulse and means for precluding a similar operation until the flux-changing conditions consequent upon the operation have passed.

10. Apparatus for producing powerful impulses of electric current for brief intervals of time comprising in combination an alternating-current generator, a low impedance external circuit, a switch for connecting said circuit across said generator, and means controllable at will which automatically effect the closure of said switch approximately at a moment when the alternating voltage is zero and open it again when the current is next again substantially zero after a single impulse, said means being incapable of repeating the operation within a period of time which is less than the time required for the passing of the flux-changing conditions consequent upon the operation.

11. Apparatus for producing a powerful impulse of electric current for a brief interval of time comprising in combination an alternating-current generator constructed to have an extra low impedance, a low impedance external circuit, a switch for connecting said circuit across said generator, means controllable at will for effecting the closure of said switch once only for a period of time of not more than that of a complete cycle of the alternating voltage.

12. Apparatus for producing a powerful impulse of electric current for a brief interval of time comprising in combination an alternating current generator having damper bars to give an extra low impedance, a low impedance external circuit, a switch for connecting said circuit across said generator, means controllable at will for effecting the closure of said switch once only for a period of time of not more than that of a complete cycle of the alternating voltage.

13. Apparatus for producing a powerful impulse of electric current for a brief interval of time comprising in combination an alternating current generator having means to give an extra low impedance, a low impedance external circuit, a switch for connecting said circuit across said generator, means controllable at will for effecting the closure of said switch once only for a period of time not more than that of a complete cycle of the alternating voltage.

14. Apparatus for producing a powerful electric impulse for a brief interval of time comprising in combination an alternating-current generator having windings which give a stepped voltage wave shape, a low impedance external circuit, a switch for connecting said circuit across said generator, means controllable at will for effecting the closure of said switch once only for a period of time of not more than that of a complete cycle of the alternating voltage.

15. Apparatus for producing powerful impulses of electric current for brief intervals of time comprising the combination with an alternating current generator, a low impedance external circuit and a switch for connecting said circuit across said generator, of closing means governed by said generator for closing said switch for an interval of time not exceeding one cycle of the alternating voltage, and controlling means operable at will for rendering said closing means operative, the apparatus being such that said controlling means is inoperative to initiate a second operation of said closing means for a longer interval of time after each closure of the switch.

16. Apparatus for producing powerful impulses of electric current for brief intervals of time comprising the combination with an alternating current generator, a low impedance external circuit and a switch for connecting said circuit across said generator, of means governed by said generator for closing said switch for an interval of time not exceeding one cycle of the alternating voltage and at a predetermined instant in said cycle, and means operable at will for rendering said closing means operative, the apparatus being such that it cannot be again operated for a longer interval of time after each closure of the switch.

17. Apparatus for producing powerful impulses of electric current for brief intervals of time comprising the combination with an alternating-current generator, a low impedance external circuit and a switch for connecting said circuit across said generator, of switch actuating means, means associated with the generator for causing the latter to close the switch at a predetermined instant in the voltage cycle when the stored energy in the generator is substantially a maximum and to open after a time interval of between one half and one cycle only of the alternating current voltage, and means controllable at will for operatively connecting together the two preceding means.

18. Apparatus for producing powerful impulses of electric current for brief intervals of time comprising the combination with an alternating-current generator, a low impedance external circuit and a switch for connecting said circuit across said generator, of switch actuating mechanism, a cam member driven by said generator, and a switch arming member which is adapted at will to be moved to an operative position between said cam member and said switch actuating mechanism to cause the generator to operate said switch and which is automatically removed to an inoperative position when the switch opens after closure, said cam member being so formed and so timed with respect to said generator that the switch will close at a predetermined instant in a voltage cycle and will open after an interval of time of between that of one half and one complete voltage cycle.

19. Apparatus for producing powerful impulses of electric current for brief intervals of time comprising the combination with an alternating-current generator, a low impedance external circuit and a switch for connecting said circuit across said generator, of cam-operated switch actuating mechanism effecting by continued motion in one direction the closure and then the opening of the switch, said mechanism being itself actuated by the generator in such manner that the switch closes at a predetermined instant in the voltage cycle and remains closed only for a time interval of between one half and one complete voltage cycle, and means for causing said switch to lock out when it has opened, said lock out means requiring to be reset to permit the switch to be operated when it is desired to obtain another impulse.

20. A cam-operated switch comprising toggle links which close the switch when on their dead centre, a spring tending to urge the toggle links to either side of their dead centre, an operating cam having surfaces of three different radii, a tappet member one end of which engages said cam, a push rod one end of which co-operates with the other end of said tappet member, means for causing said push rod and tappet to follow the surface of said cam, and a movable strut capable of being brought into and out of position between said push rod and said toggle links to permit the switch to be operated at will, the radii of the cam surfaces being such that the switch is open on the smallest, is closed on the intermediate and is open on the largest.

21. A cam-operated switch comprising toggle links which close the switch when on their dead centre, a spring tending to urge the toggle links to either side of their dead centre, an operating cam having surfaces of three different radii, a tappet member one end of which engages said cam, a push rod one end of which co-operates with the other end of said tappet member, means for causing said push rod and tappet to follow the surface of said cam, a movable strut capable of being brought into and out of position between said push rod and said toggle links to permit the switch to be operated at will, the radii of the cam surfaces being such that the switch is open on the smallest, is closed on the intermediate, and is open on the largest, a catch for retaining said tappet in its outermost position, and a tripping mechanism for said catch.

22. A cam-operated switch comprising toggle links which close the switch when on their dead centre, a spring tending to urge the toggle links to either side of their dead centre, an operating cam having surfaces of three different radii, a tappet member one end of which engages said cam, a push rod one end of which co-operates with the other end of said tappet member, means for causing said push rod and tappet to follow the surface of said cam, a movable strut capable of being brought into and out of position between said push rod and said toggle links to permit the switch to be operated at will, the radii of the cam surfaces being such that the switch is open on the smallest, is closed on the intermediate and is open on the largest, a catch for retaining said tappet in its outermost position, a tripping mechanism for said catch, and remotely controllable means for bringing said strut into its switch-operating position.

In testimony whereof I have hereunto subscribed my name this 24th day of March, 1926.

PETER KAPITZA.